(12) United States Patent
Giguere et al.

(10) Patent No.: US 7,151,398 B2
(45) Date of Patent: *Dec. 19, 2006

(54) CLOCK SIGNAL GENERATORS HAVING PROGRAMMABLE FULL-PERIOD CLOCK SKEW CONTROL

(75) Inventors: Shawn Giguere, Atlanta, GA (US); Declan P. McDonagh, Middlesex (GB); Roland Knaack, Suwanee, GA (US); Bamdhamravuri S. Satishbabu, Duluth, GA (US)

(73) Assignee: Integrated Device Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/217,195

(22) Filed: Sep. 1, 2005

(65) Prior Publication Data

US 2006/0038601 A1 Feb. 23, 2006

Related U.S. Application Data

(63) Continuation-in-part of application No. 10/648,090, filed on Aug. 26, 2003, now Pat. No. 6,977,539.

(51) Int. Cl.
*G06F 1/04* (2006.01)
(52) U.S. Cl. ..................... 327/291; 327/295
(58) Field of Classification Search ............ 327/149, 327/152–159, 161, 291, 295–299, 231–239, 327/245, 258, 162–163, 165; 331/25; 375/375
See application file for complete search history.

(56) References Cited

U.S. PATENT DOCUMENTS

| | | | |
|---|---|---|---|
| 5,477,181 A * | 12/1995 | Li et al. ............. | 328/258 |
| 5,485,490 A | 1/1996 | Leung et al. ......... | 375/371 |
| 5,565,816 A * | 10/1996 | Coteus ................. | 331/2 |
| 5,614,855 A | 3/1997 | Lee et al. ............ | 327/158 |
| 6,111,445 A | 8/2000 | Zerbe et al. ......... | 327/231 |

(Continued)

OTHER PUBLICATIONS

IDT Clock Management Products Family, Aug. 2002, Admitted Prior Art, 4 pages.

(Continued)

*Primary Examiner*—Linh My Nguyen
(74) *Attorney, Agent, or Firm*—Myers Bigel Sibley & Sajovec PA

(57) ABSTRACT

Clock signal generators include an integrated circuit chip having a PLL-based or DLL-based clock driver therein. The clock driver is configured to support generation of a plurality of clock signals having different frequencies in a range between 1 and 1/N times a frequency of an internal clock signal and full-period programmable skew characteristic, where N is a positive integer greater than one. The clock driver also includes a divide-by-N clock generator that is configured to generate N divide-by-N clock signals that have the same frequency but are phase shifted relative to each other. This clock generator operates in response to a first skew signal having a frequency equal to the frequency of the internal clock signal. A one-of-N select circuit is provided. This select circuit is configured to select one of the N divide-by-N clock signals in response to a time unit position signal. A synchronization unit is electrically coupled to an output of the divide-by-N clock generator circuit and is synchronized to the first skew signal. The synchronization unit is also coupled to an output buffer that is configured to drive an off-chip load with the selected divide-by-N clock signal having the desired skew characteristic.

9 Claims, 11 Drawing Sheets

U.S. PATENT DOCUMENTS

| | | | |
|---|---|---|---|
| 6,125,157 A | 9/2000 | Donnelly et al. | 375/371 |
| 6,271,702 B1 | 8/2001 | Stansell | 327/295 |
| 6,329,859 B1 | 12/2001 | Wu | 327/291 |
| 6,359,486 B1 | 3/2002 | Chen | 327/231 |
| 6,384,653 B1 | 5/2002 | Broome | 327/247 |
| 6,388,478 B1 | 5/2002 | Mann | 327/113 |
| 6,392,462 B1 | 5/2002 | Ebuchi et al. | |
| 6,433,645 B1 | 8/2002 | Mann et al. | 331/18 |
| 6,466,098 B1 | 10/2002 | Pickering | 331/25 |
| 6,509,773 B1 | 1/2003 | Buchwald et al. | 327/248 |
| 6,525,584 B1 | 2/2003 | Seo et al. | 327/276 |
| 6,539,072 B1 | 3/2003 | Donnelly et al. | 375/371 |
| 6,597,212 B1 | 7/2003 | Wang et al. | 327/117 |
| 6,608,530 B1 | 8/2003 | Green et al. | |
| 6,734,740 B1 * | 5/2004 | Green et al. | 331/25 |
| 6,753,712 B1 | 6/2004 | Saeki | |
| 6,759,886 B1 | 7/2004 | Nakanishi | |
| 6,794,912 B1 | 9/2004 | Hirata et al. | |

OTHER PUBLICATIONS

Rabaey, Jan M., "Synchronization at the System Level," Digital Integrated Circuits, A Design Perspective, Prentice-Hall, Inc., pp. 540-543.

"High-Speed Multi-Phase PLL Clock Buffer," Cypress Semiconductor Corporation, Revised Jul. 25, 2003, 14 pages.

Lee et al., "A 2.5 V CMOS Delay-Locked Loop for an 18 Mbit, 500 Megabyte/s DRAM," IEEE Journal of Solid-State Circuits, vol. 29, No. 12, Dec. 1994, pp. 1491-1496.

\* cited by examiner

| FIG. 2A | FIG. 2B |

CLOCK SIGNAL GENERATORS HAVING PROGRAMMABLE FULL-PERIOD CLOCK SKEW CONTROL

REFERENCE TO PRIORITY APPLICATION

This application is a continuation-in-part of U.S. application Ser. No. 10/648,090, filed Aug. 26, 2003, now U.S. Pat. No. 6,977,539, the disclosure of which is hereby incorporated herein by reference.

FIELD OF THE INVENTION

The present invention relates to integrated circuit devices and, more particularly, to integrated circuit devices having clock generators therein and methods of generating clock signals.

BACKGROUND OF THE INVENTION

Phase-locked loop (PLL) and delay-locked loop (DLL) integrated circuits are frequently used to generate highly accurate internal clock signals on integrated circuit substrates (e.g., chips). In some cases, such PLL and DLL integrated circuits may be used in multi-output clock drivers, which may provide clock distribution to a system integrator in order to optimize the timing of high-performance computer and communication systems. One conventional PLL-based clock buffer that provides only limited phase adjustments is the RoboClock™ CY7B994V, which is manufactured by Cypress Semiconductor Corp. This clock buffer is described more fully in Cypress' publicly available datasheet (Doc. No. 38-07127), which may be obtained at Cypress' website.

Unfortunately, such clock buffers may provide only partial-period clock skew control to those clock signal outputs having frequencies equal to divide-by-two or lower (i.e., divide-by-N (Div/N), where N is a positive integer greater than one), relative to an on-chip divide-by-one synchronizing clock signal. As illustrated by the timing diagram of FIG. 1, when only partial-period skew control is provided, clock signal outputs that have been set to frequencies equal to Div/2, Div/3, . . . , Div/6, Div/8, Div/10 or Div/12, for example, may only be provided with skew control that extends over 50% or less of their respective clock periods. Thus, notwithstanding these conventional clock buffers that provide some limited degree of phase adjustments, there continues to be a need for clock buffers having greater functionality and suitability for system environments requiring greater skew control.

SUMMARY OF THE INVENTION

Clock signal generators according to the present invention support generation of clock signals with full-period programmable skew characteristic. According to a first embodiment of the present invention, an integrated circuit chip is provided with a clock driver therein. This clock driver supports generation of a plurality of output clock signals having different frequencies in a range between 1 and 1/N times a frequency of an internal clock signal, where N is a positive integer greater than one. These output clock signals also have full-period programmable skew characteristics. The internal clock signal is generated by an internal clock signal generator, which may be a locked loop integrated circuit. The locked loop integrated circuit may be a phase-locked loop (PLL) integrated circuit having a voltage-controlled oscillator (VCO) therein. This voltage controlled oscillator may be programmably set to operate at a frequency within a frequency range (e.g., 200 MHz–800 MHz) that is supported by the clock driver. Alternatively, the locked loop integrated circuit may be a delay-locked loop (DLL) integrated circuit, which receives an externally generated clock signal that sets the frequency of the internal clock signal.

In particular, the clock driver is configured to support generation of a divide-by-N clock signal having a full-period programmable skew characteristic that is stepped in N×M time units having a duration equal to 1/M times a period of the internal clock signal, where M is a positive integer greater than eight. In some embodiments, M=C×F, where C and F are positive integers, which represent a number of coarse time units (ctu) of skew adjustment and fine time units (ftu) within each coarse time unit, respectively. To achieve a sufficient degree of skew control, the values of C and F may equal six (6) and four (4), respectively. Thus, a divide-by-8 clock signal may be set to one of 192 skew values (192=8×6×4), which span a full period. In other embodiments, the internal clock signal generator comprises a differential voltage-controlled oscillator (DVCO) having at least ½C stages therein.

These embodiments further include circuitry that enables full-period clock skew control in a preferred manner. This circuitry includes a divide-by-N clock generator that is responsive to a first skew signal (which may be selected in response to coarse and fine skew select signals) and a synchronization unit. The synchronization unit is electrically coupled to an output of the divide-by-N clock generator and is responsive to the first skew signal. The divide-by-N clock generator is configured to generate N separate divide-by-N clock signals that have the same frequency but are phase shifted relative to each other in equal phase increments. A one-of-N select circuit is also provided within the divide-by-N clock generator. This select circuit is configured to select one of the N divide-by-N clock signals in response to a time unit position signal. The synchronization unit is configured to synchronize the selected divide-by-N clock signal to the first skew signal.

The clock driver may also include a delay chain and phase interpolator circuit that is configured to generate the first skew signal in response to a fine skew select signal. This delay chain and phase interpolator circuit is electrically coupled to an output of a multiplexer, which may be configured to receive a plurality of skew signals from the voltage-controlled oscillator within a PLL. The multiplexer may also be responsive to a coarse skew select signal.

According to other embodiments of the present invention, the clock driver includes a locked loop integrated circuit that is configured to generate a plurality of internal clock signals that are skewed in time relative to each but have the same first frequency (e.g., VCO frequency). A skew signal select circuit is also provided. This skew signal select circuit is configured to generate a selected skew signal from at least one of the plurality of internal clock signals. A divide-by-N clock generator is also provided, which is responsive to the selected skew signal. This divide-by-N clock generator is configured to generate a plurality of divide-by-N clock signals that have the same frequency but are phase shifted relative to each other in increments of 360°/N, where N is a positive integer greater than one. This divide-by-N clock generator includes a one-of-N select circuit that is configured to select one of the plurality of divide-by-N clock signals, in response to a time unit position signal. A synchronization unit is electrically coupled to an output of the one-of-N select circuit. This synchronization unit is configured to synchronize a selected one of the plurality of divide-by-N clock signals to the selected skew signal. The synchronized signal is then passed to an output buffer. The output buffer is provided to drive an off-chip load with a divide-by-N output clock signal having a full-period programmable skew characteristic, in response to a synchronized divide-by-N clock signal that is derived directly or indirectly from the synchronization unit.

In some of these embodiments, the skew signal select circuit includes a multiplexer that is configured to receive the plurality of internal clock signals and a "fine" delay chain and phase interpolator circuit that is electrically coupled to an output of the multiplexer. Alternatively, the skew signal select circuit may include a multiplexer that is configured to receive the plurality of internal clock signals and a phase interpolator circuit that is electrically coupled to a pair of outputs of the multiplexer. In this latter case, the skew signal select circuit may not require the use of a "fine" delay chain.

Further embodiments of the present invention include methods of generating a clock signal having a full-period programmable skew characteristic, by generating a plurality of internal clock signals that have equivalent frequencies, but are phase shifted relative to each other in equal time increments. At least one of the plurality of internal clock signals is then selected, in response to a coarse skew select signal. A selected skew signal is then generated from the at least one selected plurality of internal clock signals. A plurality of divide-by-N clock signals are generated in response to the selected skew signal. The plurality of divide-by-N clock signals, which are of equal frequency, are phase shifted relative to each other in increments of 360°/N, where N is a positive integer greater than one. One of these plurality of divide-by-N clock signals is selected in response to a time unit position signal. The selected divide-by-N clock signal is then synchronized to the selected skew signal. In still further embodiments, a pair of differential divide-by-N output clock signals are generated from the synchronized divide-by-N clock signal.

DETAILED DESCRIPTION OF PREFERRED EMBODIMENTS

Figure 1:
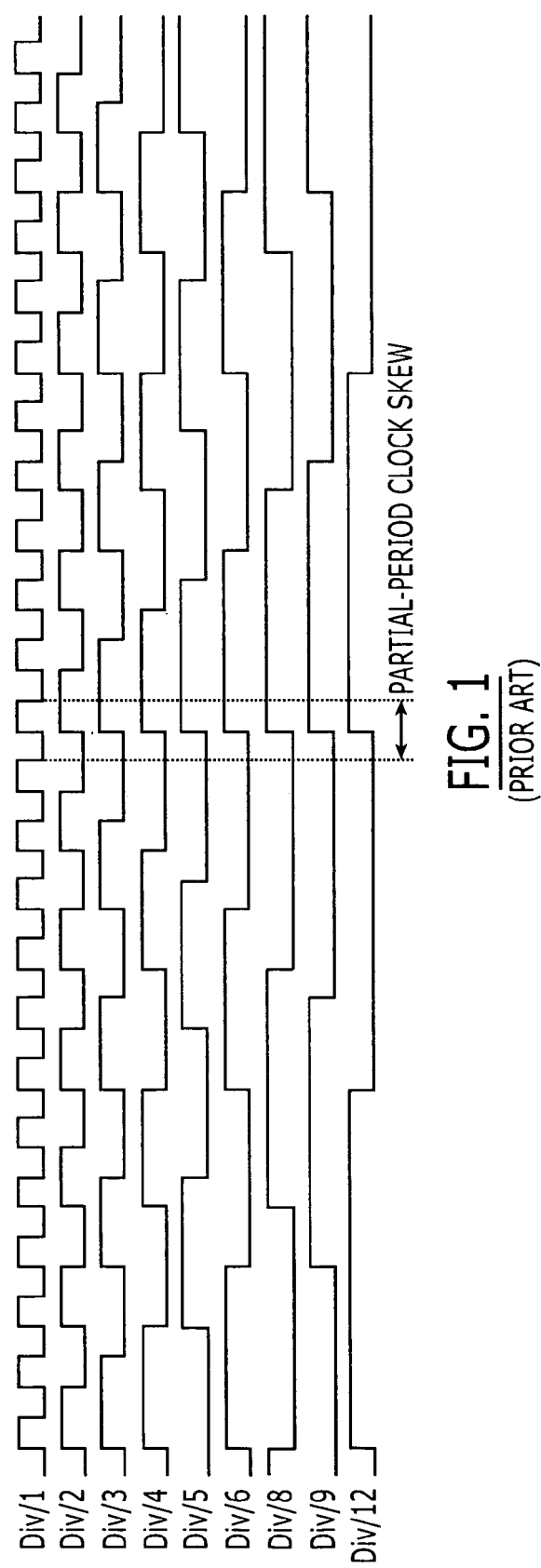
FIG. 1 is a timing diagram that illustrates a plurality of divide-by-N clock signals that are edge aligned.

The present invention now will be described more fully herein with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art. Like reference numerals refer to like elements throughout and signal lines and signals thereon may be referred to by the same reference characters. Signals may also be synchronized and/or undergo minor boolean operations (e.g., inversion) without being considered different signals. The suffix B (or prefix symbol "/") to a signal name may also denote a complementary data or information signal or an active low control signal, for example.

Figures 2, 2A:
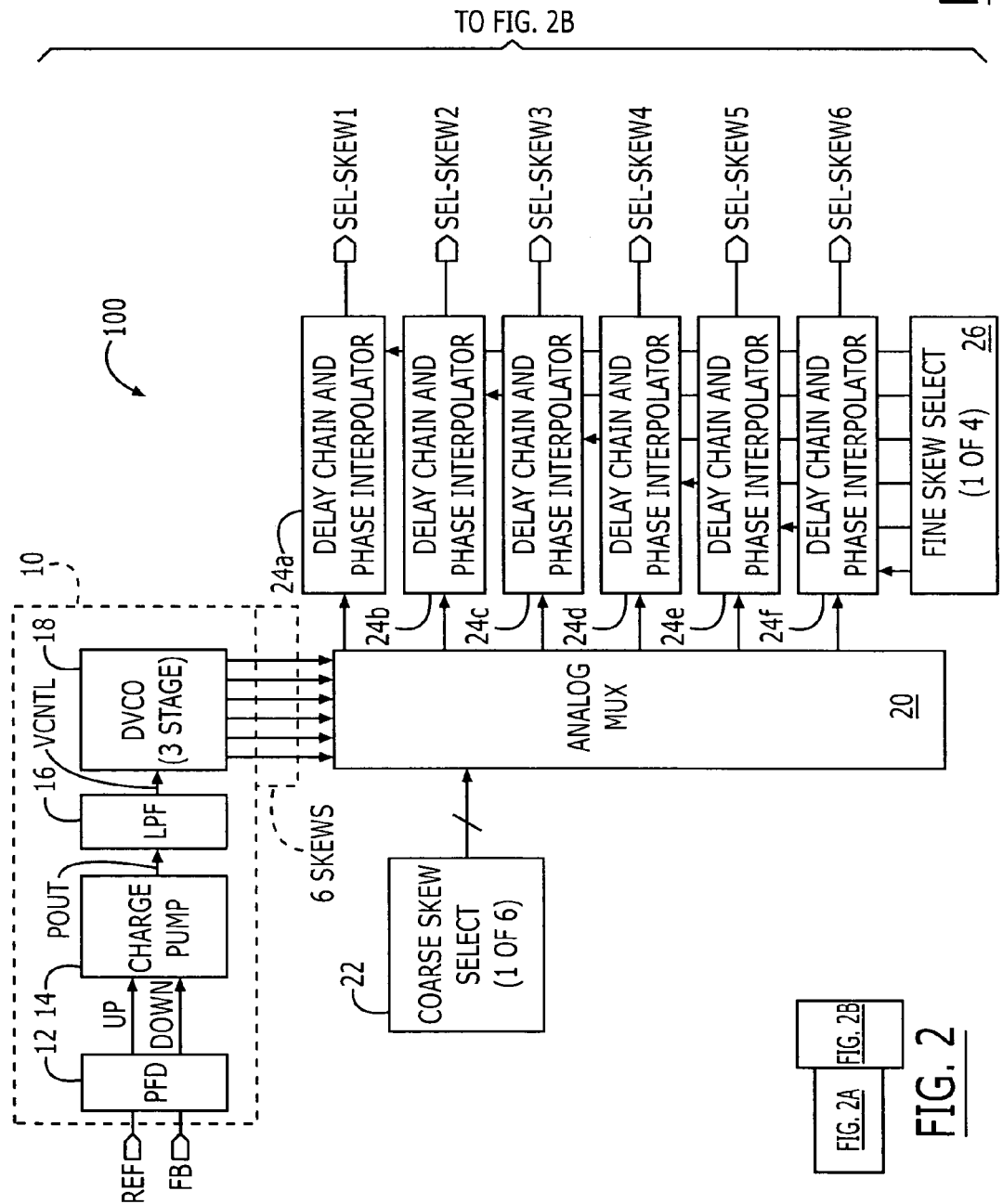
FIG. 2 is a block diagram of a PLL-based clock driver according to an embodiment of the present invention.

Referring now to FIG. 2A, a clock driver 100 according to a first embodiment of the present invention will be described. This clock driver 100 includes an internal clock signal generator that is configured to generate a plurality of phase-shifted clock signals on an integrated circuit chip. An exemplary internal clock signal generator is illustrated as a phase-locked loop (PLL) integrated circuit 10 and the plurality of phase-shifted clock signals are illustrated as six "skew" signals, which are phase-shifted relative to each other in increments of 360°/6. A greater or fewer number of skew signals may also be provided in other clock driver embodiments. These six skew signals may also be treated as time unit signals having equally-spaced phases: $TU_{-2}$, $TU_{-1}$, $TU_0$, $TU_1$, $TU_2$ and $TU_3$. The PLL integrated circuit 10 is illustrated as including a phase-frequency detector (PFD) 12, a charge pump 14, a loop filter 16 (e.g., low-pass filter) and a voltage controlled oscillator (VCO) 18, which is shown as a differential VCO (DVCO) having three stages. The PFD 12 may be configured to generate UP and DOWN control signals in response to a reference clock signal (REF) and a feedback clock signal (FB). As will be understood by those skilled in the art, this feedback clock signal FB may be generated from one of the six illustrated "skew" signals generated by the voltage controlled oscillator 18. In particular, the PFD 12 may be configured to compare the phases of the reference and feedback clock signals and generate an active UP signal or an active DOWN signal when the feedback clock signal FB lags or leads the reference clock signal REF. The reference clock signal REF may be a buffered version of an external clock signal (not shown) that is received by an integrated circuit chip.

The charge pump 14 may be operative to convert the digitally encoded UP and DOWN control signals into an analog pump output signal (POUT) that sources current to or sinks current from the loop filter 16. The loop filter 16 is illustrated as generating an analog control voltage (VCNTL), which is provided as an input to the VCO 18. An active UP signal may operate to increase the value of the control voltage, which speeds up the VCO 18 and causes the feedback clock signal FB to catch up with the reference clock signal REF. On the other hand, an active DOWN signal may slow down the VCO 18 and eliminate the phase lead of the feedback clock signal FB. These and other aspects of conventional PLL circuits are more fully illustrated and described at section 9.5.2 of a textbook by Jan M. Rabaey, entitled Digital Integrated Circuits: A Design Perspective, Prentice-Hall, ISBN 0-13-178609-1, pp. 540–542.

The VCO 18 is illustrated as having a plurality of differential stages, which are each responsible for generating a pair of skew signals. Each pair of skew signals includes a true skew signal and a complementary skew signal, which is 180° out-of-phase relative to the corresponding true skew signal. Thus, three pairs of differential skew signals result in six skew signals (6 SKEWS) that are "coarsely" separated from each other by 60°. As illustrated, these skew signals are provided to a skew signal select circuit, which is configured to generate a plurality of selected skew signals (SEL-SKEW1 to SEL-SKEW6). The skew signal select circuit is illustrated as including an analog multiplexer 20, a coarse skew select circuit 22, a fine skew select circuit 26 and a plurality of delay chain and phase interpolator circuits 24a–24f. Other embodiments of a skew signal select circuit are also possible.

The coarse and fine skew select circuits 22 and 26 may have programmable features that support field programming of the clock driver 100 by an end user. For example, non-volatile memory (not shown) may be provided within a packaged clock driver chip to support automatic updating of skew configuration data during each power-down/up or other reset event. The coarse skew select circuit 22 is configured to generate a plurality of coarse skew select signals, which are received by the multiplexer 20. In response to the coarse skew select signals, the multiplexer 20 routes one or more of the skew signals to a plurality of outputs of the multiplexer 20. In some applications, a single "coarsely" selected skew signal may be routed (i.e., broadcast) to a plurality of outputs of the multiplexer 20.

Figure 4A:
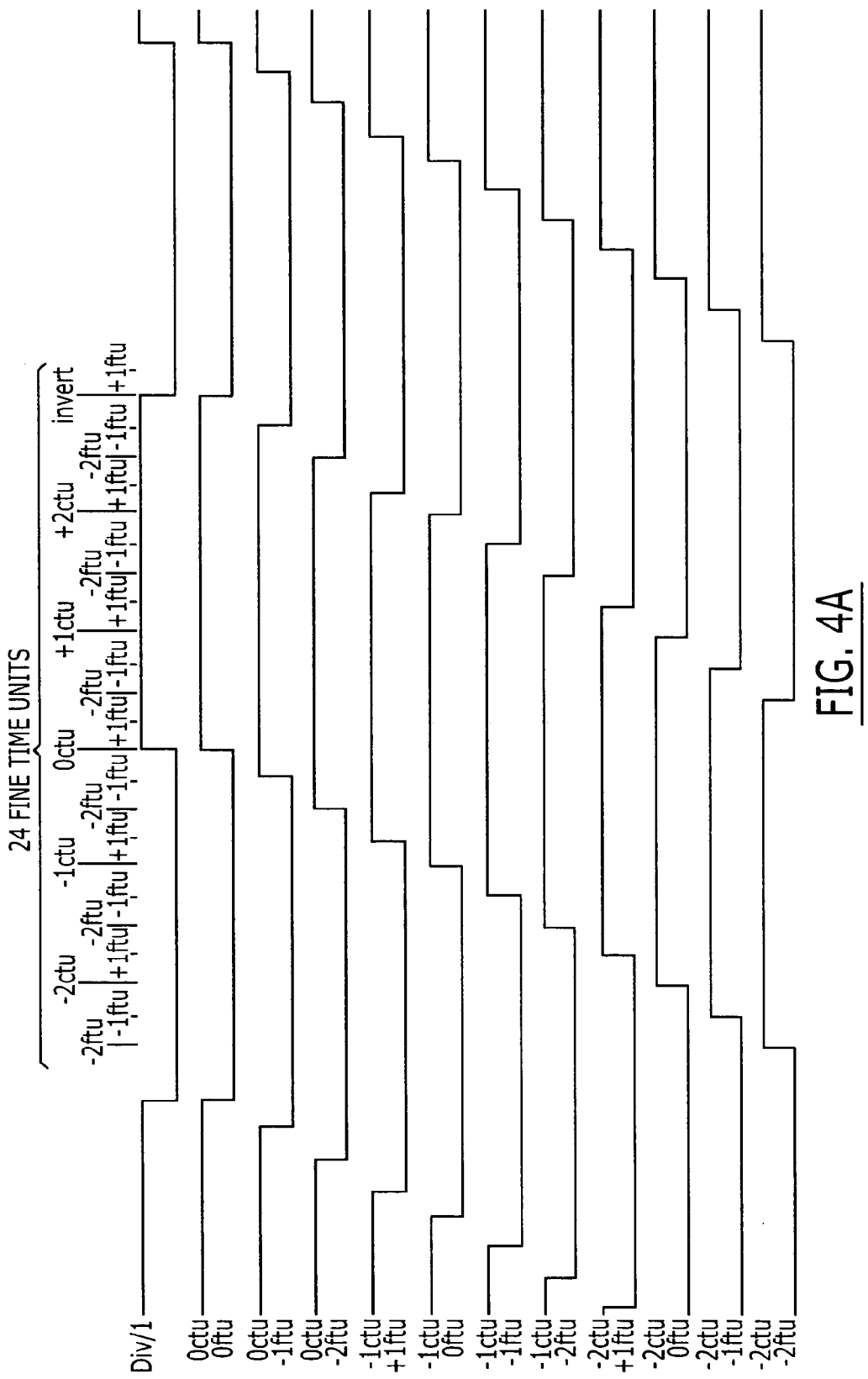
FIG. 4A is a timing diagram that illustrates the range of a full-period of programmable skews that apply to a divide-by-N clock signal, where N=1 and the coarse time range is from −((3×N)−1) to +((3×N)−1) & INVERT.

Each of the coarsely selected skew signals is provided to one or more of the delay chain and phase interpolator circuits 24a–24f. The delay chain and phase interpolator circuits 24a–24f are responsive to respective fine skew select signals, which are generated by the fine skew select circuit 26. The delay chain and phase interpolator circuits may be of conventional design and need not be described further herein. In the illustrated embodiment, four time units of fine skew control are provided by each of the delay chain and phase interpolator circuits 24a–24f and six time units of coarse skew control are provided by the coarse skew select circuit 22 and multiplexer 20. Accordingly, each of the selected skew signals SEL-SKEW1 to SEL-SKEW6 may be skewed in fine time increments of Tvco/24, where Tvco represents the period of the signals generated by the voltage-controlled oscillator 18. These increments are more fully illustrated by FIG. 4A, which is a timing diagram that illustrates the range of a full-period of programmable skews that apply to a divide-by-one selected skew signal (e.g., SEL-SKEWn, where n=1 to 6). In FIG. 4A, the coarse time range is from −((3×N)−1) to +((3×N)−1) & INVERT, where N=1. The signal Div/1 has the same timing as the signal that has been shifted in time by zero coarse time units and zero fine time units, which is shown as: (0 ctu, 0 ftu). The signal (0 ctu, −1 ftu) represents a selected skew signal that leads the signal Div/1 by one fine time unit. Similarly, the signal (−2 ctu, −2 ftu) leads the signal Div/1 by ten time units. Selected skew signals having positive ctu values are also possible, as described more fully hereinbelow.

Figure 2B:
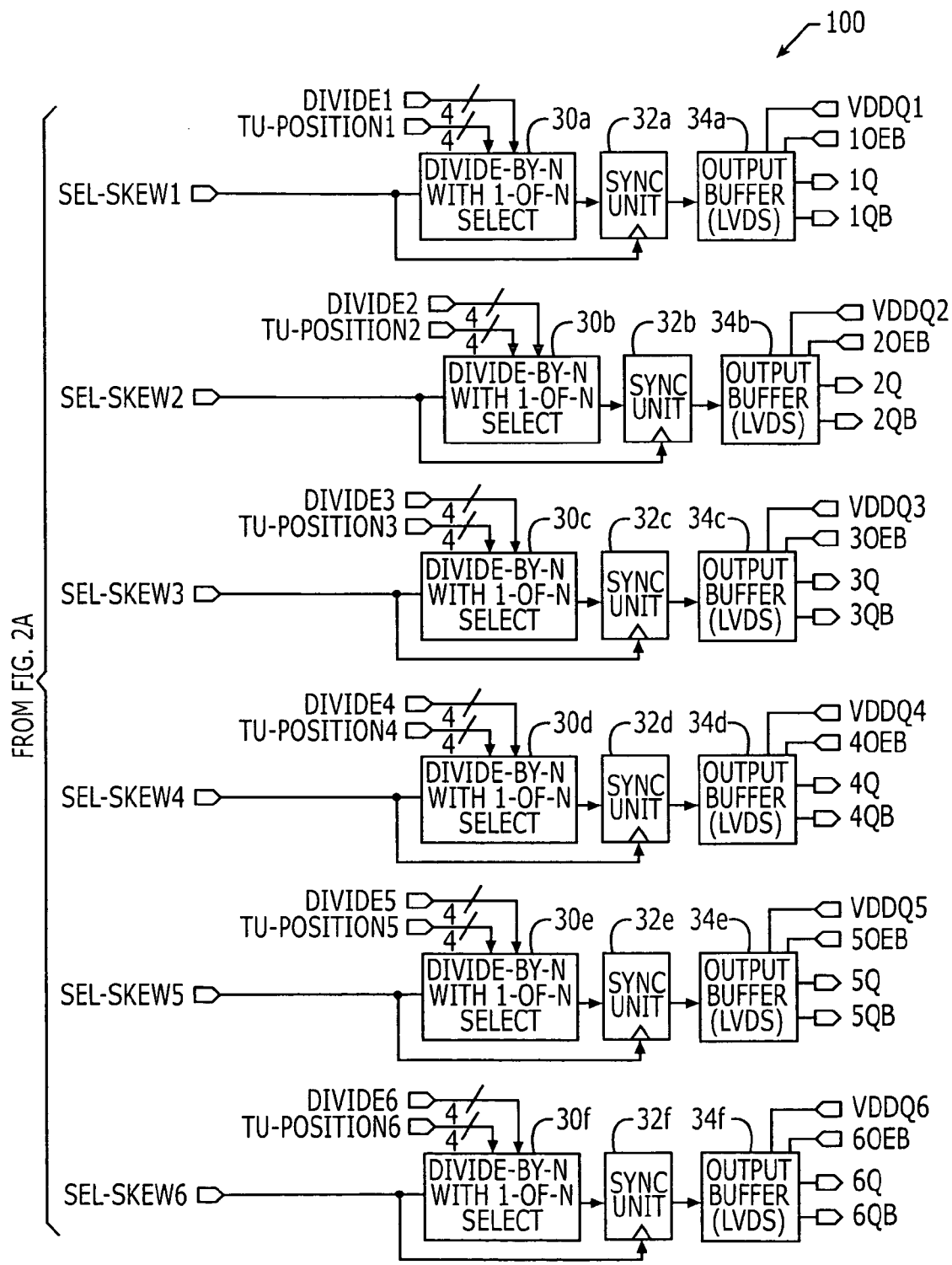

The selected skew signals of FIG. 2A are provided as inputs to the divide-by-N clock generators 30a–30f of FIG. 2B. These clock generators 30a–30f are responsive to a plurality of multi-bit control signals, which are shown as the divide signals DIVIDEn and the time unit position signals TU-POSITIONn, where n=1 to 6 in the illustrated embodiment. Each of the divide-by-N clock generators 30a–30f includes a corresponding divide-by-N clock generator circuit and a 1-of-N select circuit. The divide-by-N clock generator circuit is configured to generate N phase-shifted divide-by-N clock signals, with the value N being set by the corresponding divide signal DIVIDEn. The 1-of-N select circuit is configured to select one of the N phase-shifted divide-by-N clock signals.

Figure 5:
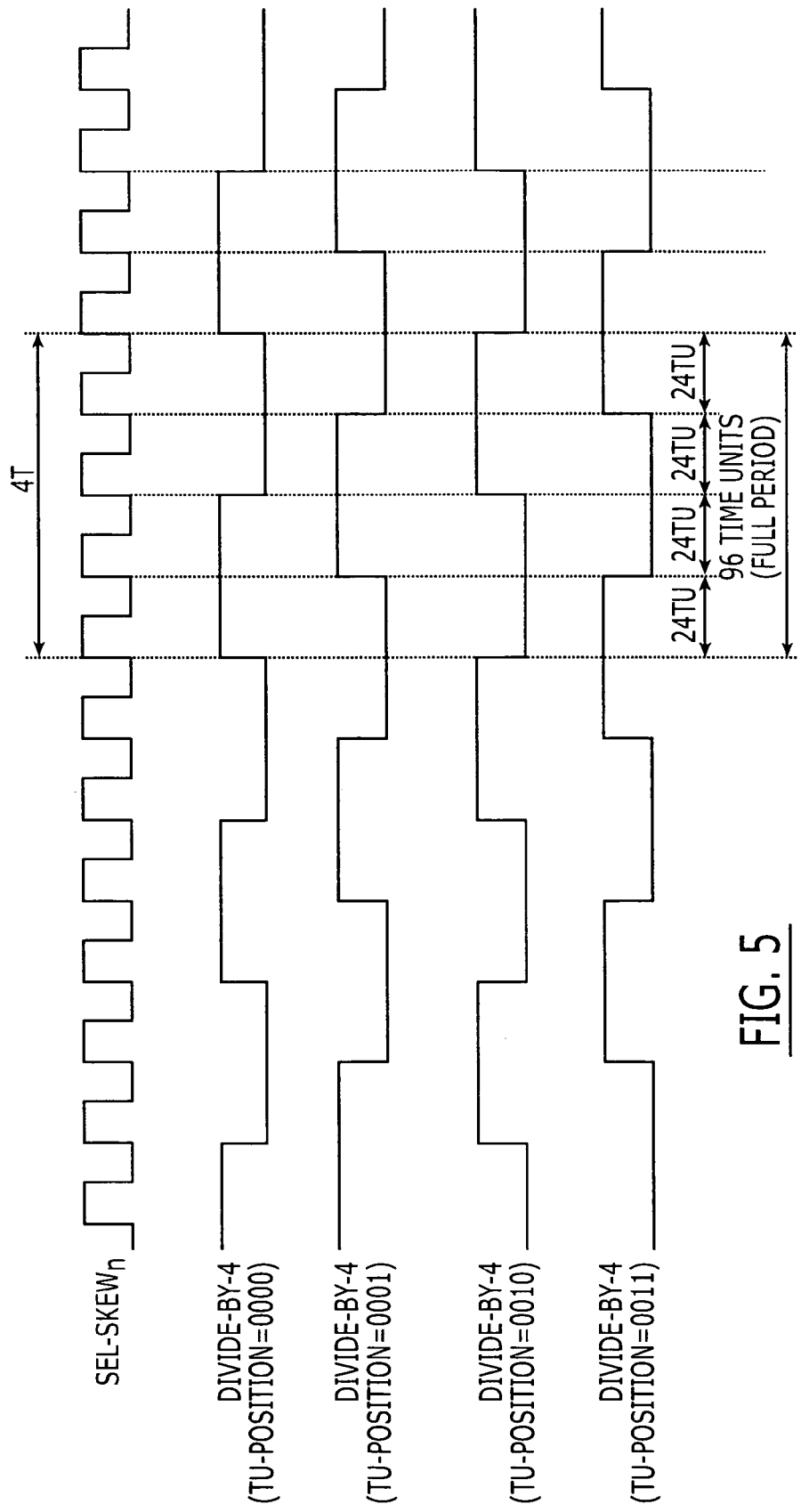
FIG. 5 is a timing diagram that illustrates a plurality of divide-by-4 clock signals that are phase-shifted by 90° relative to each other, with each signal possessing a T/4 (one-quarter period) skew characteristic.

As illustrated by the timing diagram of FIG. 5, if N=4, then four divide-by-4 clock signals will be generated by the divide-by-N clock generator circuit. Each of the four divide-by-4 clock signals will retain the corresponding skew characteristics that is represented in the selected skew signal provided by the skew signal select circuit of FIG. 2A. The four divide-by-4 clock signals will be phase-shifted in increments of 90°, where 90°=360°/4. The value of the time unit position signal TU-POSITIONn determines which one of the N phase-shifted divide-by-N clock signals will be provided to the corresponding synchronization unit 32a–32f. Accordingly, the signals generated by the coarse and fine skew select circuits 22 and 26 and the time unit position signal TU-POSITIONn can be programmed to collectively provide a selected divide-by-N clock signal having a desired skew characteristic. Because the time unit position signal TU-POSITIONn is freely programmable over the N possible values, a programmable full period skew characteristic can be achieved at the output of each divide-by-N clock generator 30a–30f. In FIG. 5, this full-period skew characteristic is illustrated as ranging over 96 time units for the case where N=4 and 96=4×24.

This full period skew characteristic is more fully illustrated by TABLE 1, where the voltage-controlled oscillator (VCO) frequency is illustrated as ranging from 200 MHz to 800 MHz and the frequency of clock signals generated at outputs of the clock driver 100 are illustrated as ranging from 16.67 MHz to 800 MHz. The duration of each coarse time unit (ctu) equals one-sixth the period of the voltage-controlled oscillator and the duration of each fine time unit (ftu) equals one-fourth the duration of the coarse time unit. Thus, in the illustrated embodiment, the total number of fine time units across a full period of skew control equals 24×N. Other embodiments having a different number of time units across a full period are also possible.

TABLE 1

| FREQUENCY VCO (MHz) | OUTPUT FREQUENCY (MHz) | PERIOD = Tout (ns) | COARSE TIME UNIT DURATION (ps) (CTU = Tvco/6) | FINE TIME UNIT DURATION (ps) (FTU = CTU/4) | NUMBER OF TIME UNITS | FULL PERIOD SKEW CONTROL |
|---|---|---|---|---|---|---|
| 800 | 800 | 1.25 | 208 | 52 | 24 | 24 × 52 ps = 1.25 ns |
| 600 | 600 | 1.66 | 277 | 69.25 | 24 | 24 × 69.25 ps = 1.66 ns |

TABLE 1-continued

| FREQUENCY VCO (MHz) | OUTPUT FREQUENCY (MHz) | PERIOD = Tout (ns) | COARSE TIME UNIT DURATION (ps) (CTU = Tvco/6) | FINE TIME UNIT DURATION (ps) (FTU = CTU/4) | NUMBER OF TIME UNITS | FULL PERIOD SKEW CONTROL |
|---|---|---|---|---|---|---|
| 400 | 400 | 2.5 | 416 | 104 | 24 | 24 × 104 ps = 2.5 ns |
| 200 | 200 | 5 | 833 | 208 | 24 | 24 × 208 ps = 5 ns |
| 200 | 50 (div 4) | 20 | 833 | 208 | 24 × 4 = 96 | 96 × 208 ps = 20 ns |
| 400 | 50 (div 8) | 20 | 416 | 104 | 24 × 8 = 192 | 192 × 104 ps = 20 ns |
| 800 | 66.67 (div 12) | 15 | 208 | 52 | 24 × 12 = 288 | 288 × 52 ps = 15 ns |
| 200 | 16.67 (div 12) | 60 | 833 | 208 | 24 × 12 = 288 | 288 × 208 ps = 60 ns |

Figure 4B:
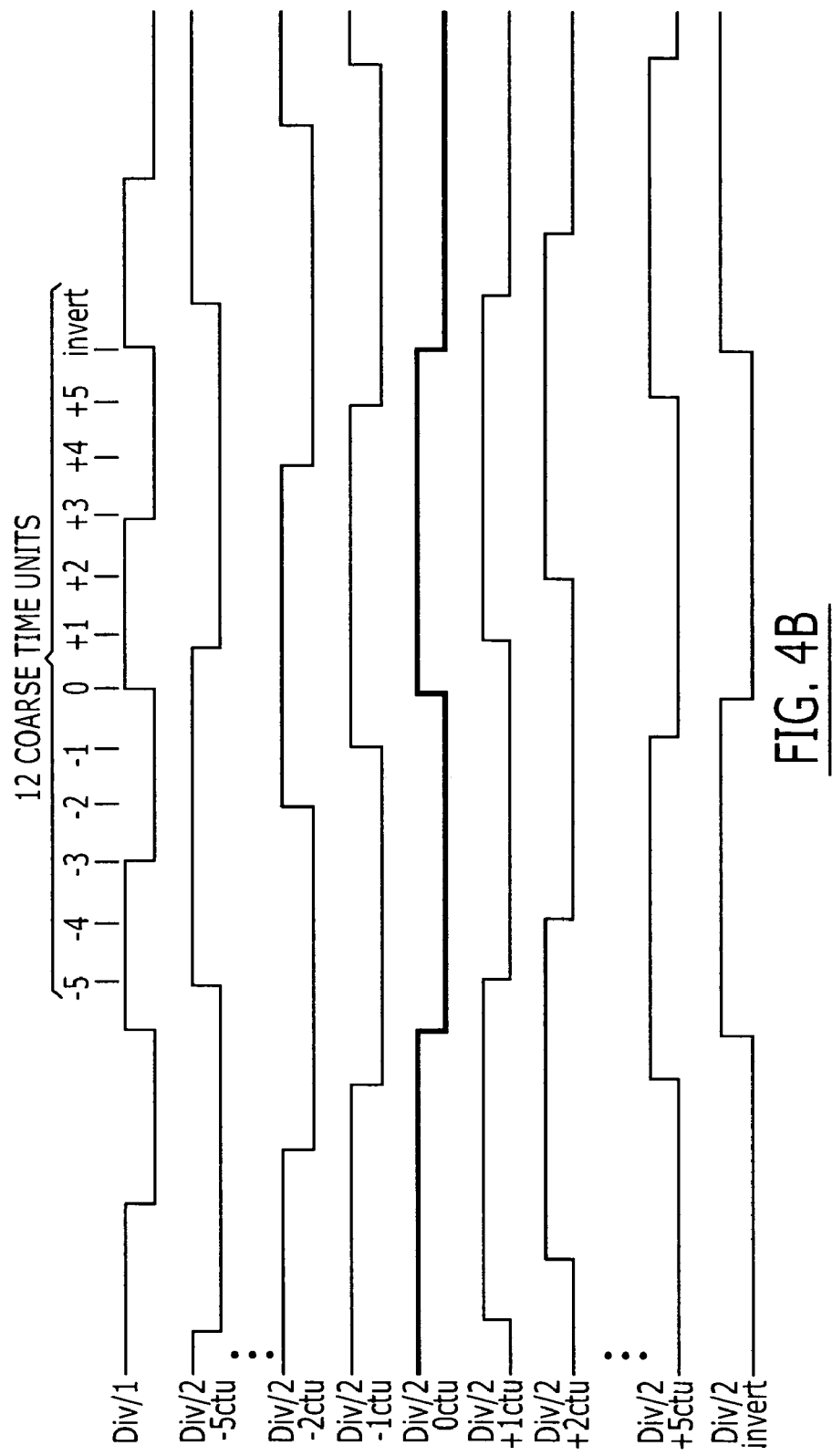
FIG. 4B is a timing diagram that illustrates the range of a full-period of programmable skews that apply to a divide-by-N clock signal, where N=2 and the coarse time range is from −((3×N)−1) to +((3×N)−1) & INVERT.
Figure 4C:
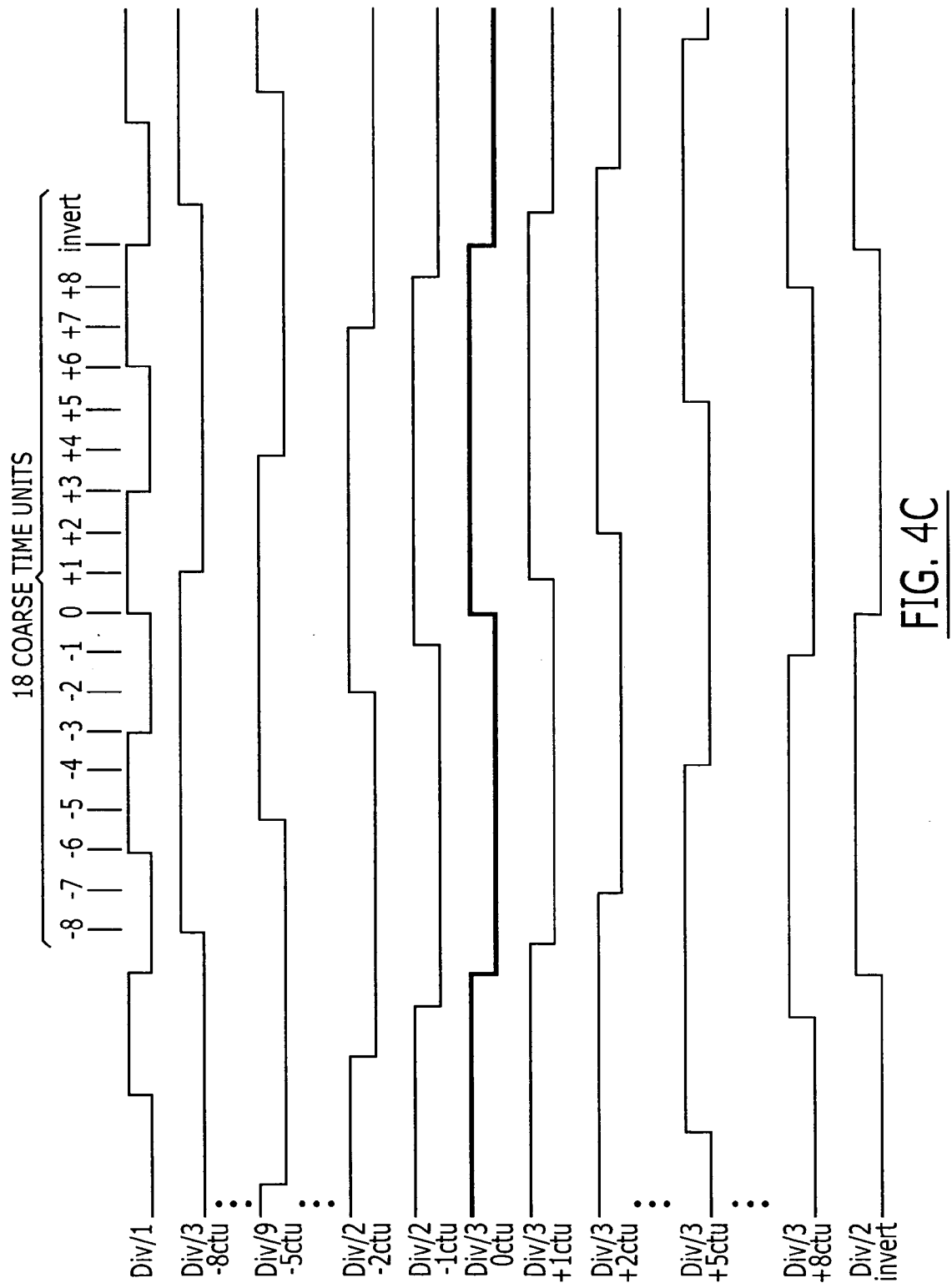
FIG. 4C is a timing diagram that illustrates the range of a full-period of programmable skews that apply to a divide-by-N clock signal, where N=3 and the coarse time range is from −((3×N)−1) to +((3×N)−1) & INVERT.

The full-period shew characteristics associated with selected divide-by-2 (Div/2) and divide-by-3 (Div/3) clock signals are further illustrated by the timing diagrams of FIGS. 4B–4C, respectively. In particular, FIG. 4B illustrates a coarse time unit range from −((3×2)−1)ctu to +((3×2)−1)ctu & INVERT, which includes 12 coarse time units and 12×4=48 fine time units across a full period. The Div/2 clock signal that is highlighted in bold in FIG. 4B represents a clock signal having zero timing skew relative to one of the skew signals (i.e., a reference skew signal) generated by the VCO 18. The Div/2 clock signals that are above the highlighted Div/2 signal have leading skew characteristics and the Div/2 clock signals that are below the highlighted Div/2 signal have lagging skew characteristics. Similarly, FIG. 4C illustrates a coarse time unit range from −((3×3)−1)ctu to +((3×3)−1)ctu & INVERT, which includes 18 coarse time units and 18×4=72 fine time units across a full period. The Div/3 clock signal that is highlighted in bold in FIG. 4C represents a clock signal having zero timing skew relative to one of the skew signals (i.e., a reference skew signal) generated by the VCO 18. The Div/3 clock signals that are above the highlighted Div/3 signal have leading skew characteristics and the Div/3 clock signals that are below the highlighted Div/3 signal have lagging skew characteristics.

The range of full-period skew characteristics associated with the following clock signals: Div/2, Div/3, Div/4, Div/5, Div/6, Div/8, Div/10 and Div/12, are more fully illustrated by TABLE 2.

clock generator 30a–30f is passed to a corresponding one of the synchronization units 32a–32f and resynchronized with the timing of the corresponding selected skew signal. After resynchronization, each selected divide-by-N clock signal is passed to a respective one of the plurality of output buffers 34a–34f. These output buffers 34a–34f are illustrated as differential output buffers that drive output pins with complementary clock signals, shown as nQ and nQB, where n=1 to 6. These output buffers 34a–34f may be configured to generate differential clock signals having different voltage swings, as established by the respective power supply lines (shown as VDDQn) provided to each buffer. Active low output enable signals (nOEB) are also provided to each of the output buffers 34a–34f. When an output enable signal nOEB is set high, the differential outputs of a respective output buffer are set to high impedance states. Output buffers of different design may also be used.

Figure 6A:
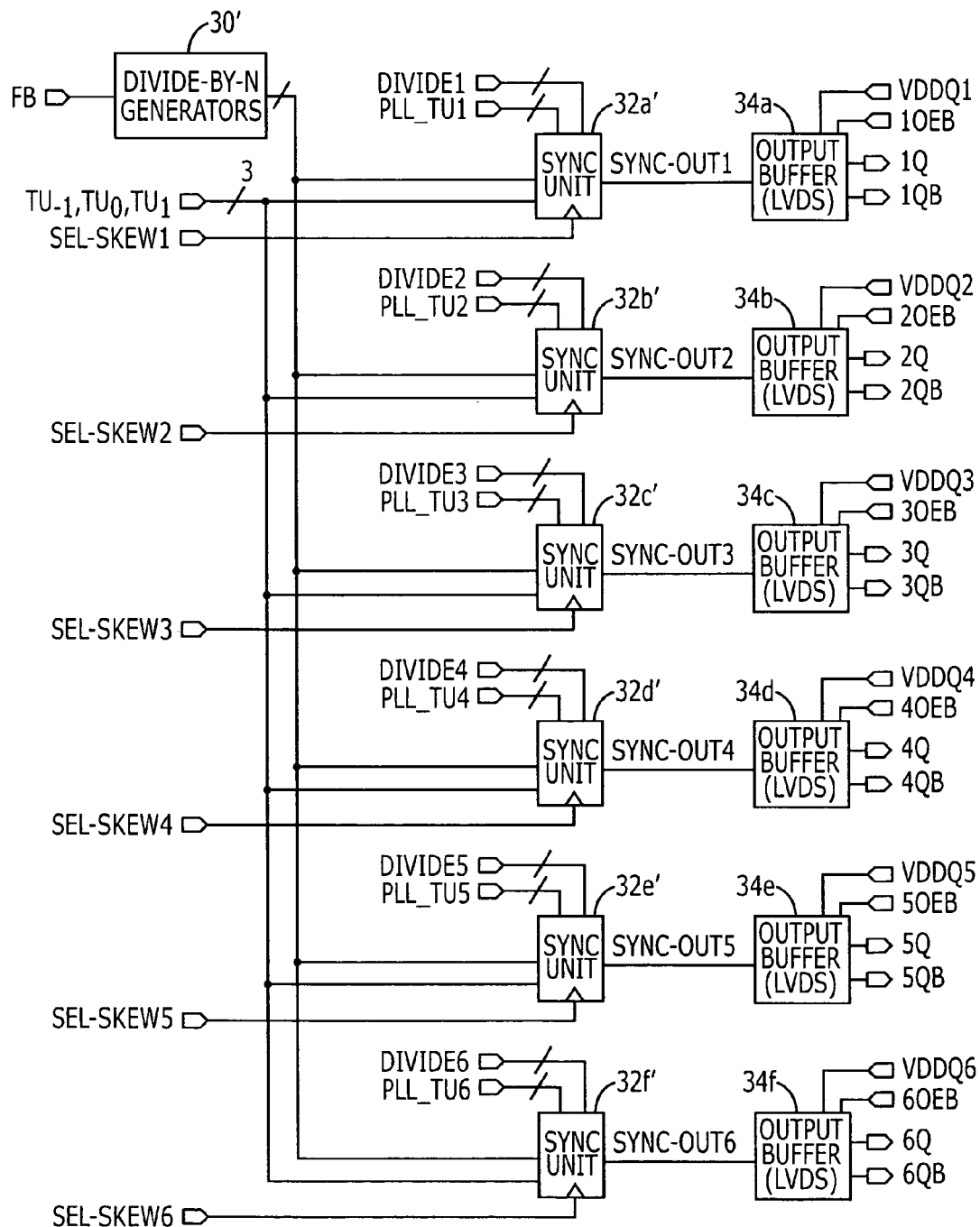
FIG. 6A is a block diagram of an output stage of a clock driver according to additional embodiments of the present invention
Figure 6B:
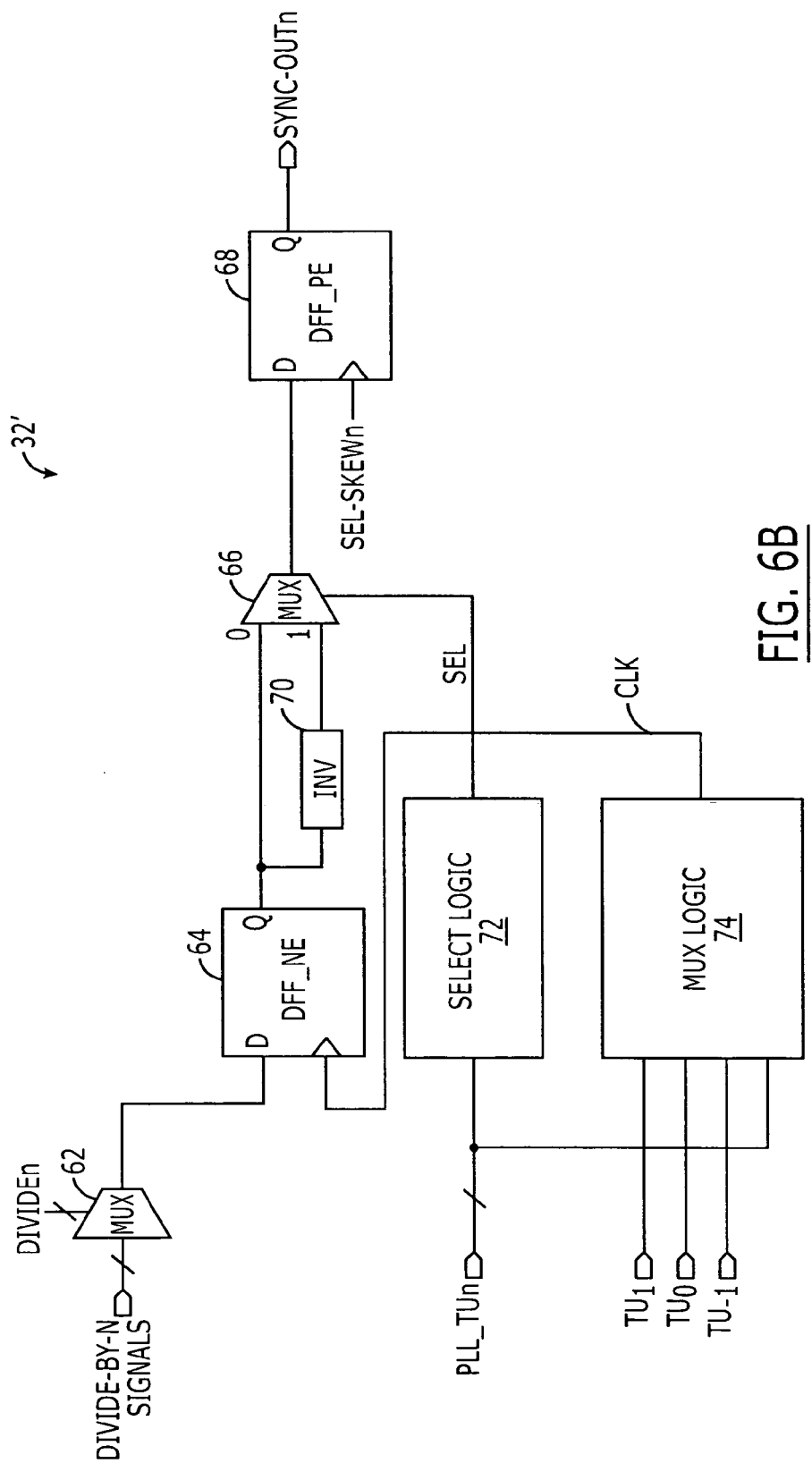
FIG. 6B is a block diagram of a synchronization unit that may be used in the output stage illustrated by FIG. 6A.

FIGS. 6A–6B illustrate an alternative embodiment to the sequential stages illustrated by FIG. 2B. As illustrated by FIG. 6A, a plurality of divide-by-N clock generators 30' are provided to generate multiple divide-by-N clock signals. In some embodiments, these divide-by-N clock signals may include Div/2, Div/3, Div/4, Div/5, Div/6, Div/8, Div/10 and Div/12 clock signals, which are provided on a bus as inputs to a plurality of synchronization units 32a'–32f'. Each of the synchronization units 32a'–32f' is responsive to a corresponding divide signal DIVIDEn, PLL time unit signal (PLL_TUn) and a selected skew signal SEL-SKEWn. The

TABLE 2

| DIVIDE-BY-N | COARSE TIME UNITS | FINE TIME UNITS | TIME UNIT RANGE −((3 × N) − 1)ctu to +((3 × N) − 1)ctu & INVERT |
|---|---|---|---|
| 1 | 6 | 4 | {(−2ctu, −2ftu), . . . , (+2ctu, +1ftu), (invert, −2ftu), . . . , (invert, +1ftu)} = 24 Time Units |
| 2 | 12 = 6 × 2 | 4 | {(−5ctu, −2ftu), . . . , (+2ctu, +1ftu), (invert, −2ftu), . . . , (invert, +1ftu)} = 48 Time Units |
| 3 | 18 = 6 × 3 | 4 | {(−8ctu, −2ftu), . . . , (+8ctu, +1ftu), (invert, −2ftu), . . . , (invert, +1ftu)} = 72 Time Units |
| 4 | 24 = 6 × 4 | 4 | {(−11ctu, −2ftu), . . . , (+11ctu, +1ftu), (invert, −2ftu), . . . , (invert, +1ftu)} = 96 Time Units |
| 5 | 30 = 6 × 5 | 4 | {(−14ctu, −2ftu), . . . , (+14ctu, +1ftu), (invert, −2ftu), . . . , (invert, +1ftu)} = 120 Time Units |
| 6 | 36 = 6 × 6 | 4 | {(−17tu, −2ftu), . . . , (+17ctu, +1ftu), (invert, −2ftu), . . . , (invert, +1ftu)} = 144 Time Units |
| 8 | 48 = 6 × 8 | 4 | {(−23ctu, −2ftu), . . . , (+23ctu, +1ftu), (invert, −2ftu), . . . , (invert, +1ftu)} = 192 Time Units |
| 10 | 60 = 6 × 10 | 4 | {(−29ctu, −2ftu), . . . , (+29ctu, +1ftu), (invert, −2ftu), . . . , (invert, +1ftu)} = 240 Time Units |
| 12 | 72 = 6 × 12 | 4 | {(−35ctu, −2ftu), . . . , (+35ctu, +1ftu), (invert, −2ftu), . . . , (invert, +1ftu)} = 288 Time Units |

Referring again to FIG. 2B, each selected divide-by-N clock signal that is generated by a respective divide-by-N PLL time unit signal PLL_TUn represents a multi-bit value (e.g., 3-bit binary value) that designates which of the skews from the PLL integrated circuit 10 (see, e.g., 6 SKEWS (e.g., skews: −2 (−120°), −1 (−60°), 0 (0°), 1 (60°), 2 (120°), 3 (180°) in FIG. 2A) the corresponding selected skew-signal SEL-SKEWn was generated from. The synchronization units 32a'–32f are also responsive to a plurality of time unit signals. These time unit signals include three time unit signals $TU_{-1}$, $TU_0$ and $TU_1$, which are phase separated from each other in increments of 60 degrees. These time unit signals may be the skew signals generated by the voltage controlled oscillator 18.

As illustrated by FIG. 6B, each of the synchronization units 32a'–32f may include multiplexer and other selection logic. Each of the synchronization units 32a'–32f is configured to generate a divide-by-N output signal (SYNC_OUTn) that is synchronized with a corresponding selected skew signal SEL-SKEWn. In particular, a first multiplexer 62 is used to select one divide-by-N clock signal from a plurality of the divide-by-N clock signals generated by the generators 30'. The selected divide-by-N clock signal is provided to a data input of a first flip-flop 64, which is illustrated as a negative edge triggered D-type flip flop (DFF_NE). An inverting device 70 is provided to invert the phase of an output of the flip-flop 64. In this manner, a second multiplexer 66 may be provided with two clock signals that are 180° out-of-phase relative to each other. A select signal SEL, which is provided to the second multiplexer 66, is generated by a select logic circuit 72. This select signal SEL has a logic value equal to "1" when the PLL time unit signal (PLL_TUn) has a value equal to −2, 2 or 3, or a logic value equal to "0" when the PLL time unit signal (PLL_TUn) has a value equal to −1, 0 or 1. The value of this select signal SEL controls whether the output of the first flip-flop 64 or its inverse is provided to the data input of the second flip-flop 68.

The synchronization terminal of the first flip-flop 64 receives a periodic signal (CLK) generated by a multiplexer logic circuit 74, which is responsive to the three periodic time unit signals $TU_{-1}$, $TU_0$ and $TU_1$ and the multi-bit PLL time unit signal PLL_TUn. The multiplexer logic circuit 74 performs the selection functions illustrated by TABLE 3:

TABLE 3

| INPUT | OUTPUT |
|---|---|
| PLL_TU = 1 or −2 | CLK = $TU_1$ |
| PLL_TU = 0 or 3 | CLK = $TU_0$ |
| PLL_TU = −1 or 2 | CLK = $TU_{-1}$ |

Figure 3A:
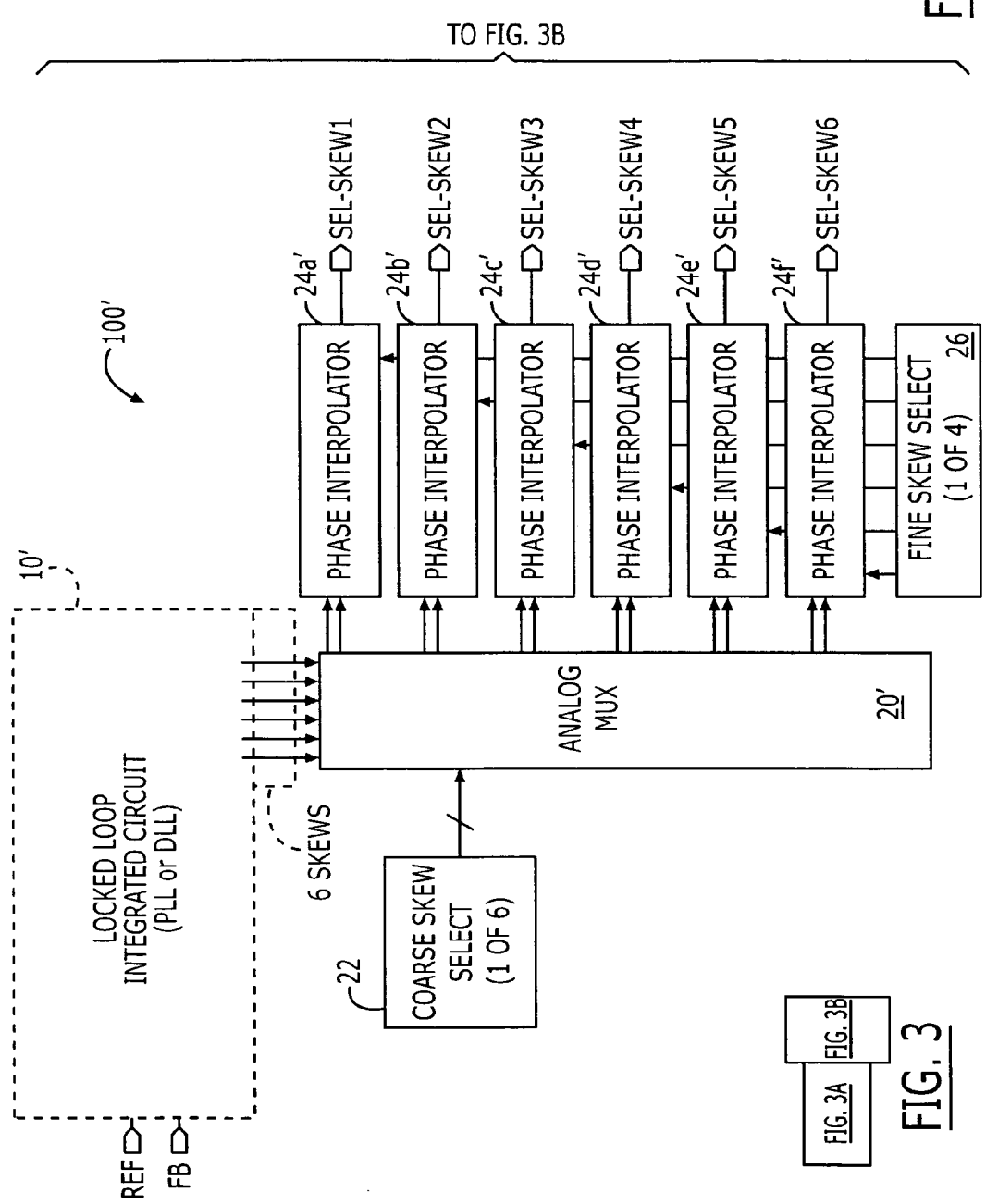
FIG. 3 is a block diagram of a clock driver according to another embodiment of the present invention.
Figure 3B:
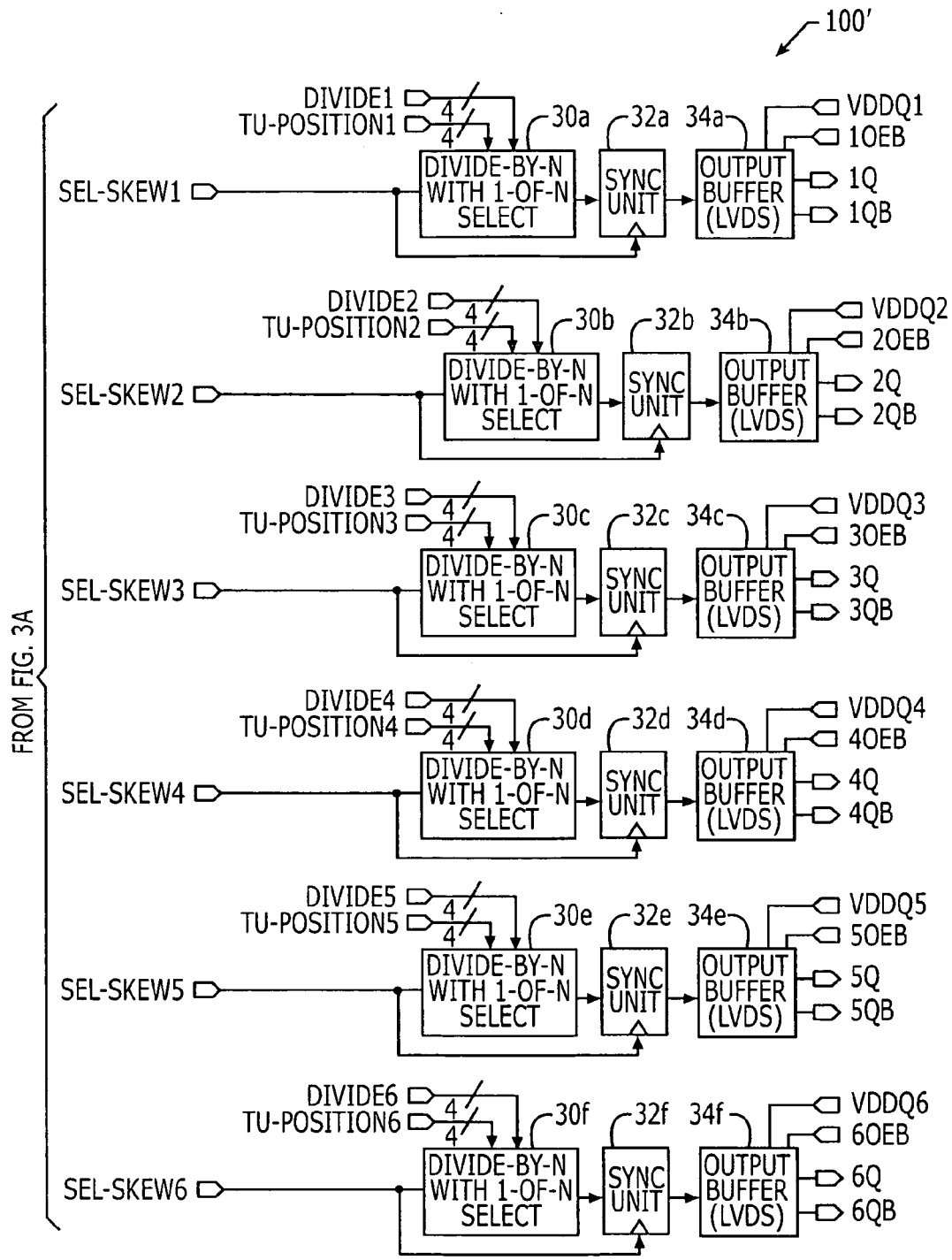

Referring now to FIG. 3, a clock driver 100' according to another embodiment of the present invention will be described. The clock driver 100' of FIG. 3 is similar to the clock driver 100 of FIG. 2, however a more general locked loop integrated circuit 10' is illustrated. This locked loop integrated circuit 10' may be a phase-locked loop (PLL) or a delay-locked loop (DLL) integrated circuit. Moreover, a multiplexer 20' is provided having six pairs of outputs. These six pairs of outputs are provided to corresponding phase interpolator circuits 24a'–24f', which are responsive to corresponding fine skew select signals that are generated by the fine skew select circuit 26. If the six skew signals generated by the locked loop integrated circuit 10' are labeled as SKEW1–SKEW6 according to their consecutive phases, then the pairs of skew signals that could be selected by the coarse skew select circuit 22 would be grouped as follows: (SKEW1, SKEW2), (SKEW2, SKEW3), (SKEW3, SKEW4), (SKEW4, SKEW5), (SKEW5, SKEW6) and (SKEW6, SKEW1). The phase interpolator circuits 24a'–24f' operate to generate a selected skew signal SEL-SKEWn having a fine skew adjustment relative to one of the pairs of skew signals. The other elements illustrated by FIG. 3 are otherwise equivalent to those described above with respect to FIG. 2 and need not be described further herein.

Notwithstanding this disclosure of preferred techniques to generate clock signals having full-period skew characteristics, less preferred clock drivers may be configured to generate clock signals having less than full-period skew characteristics. For example, the divide-by-N clock generators 30a–30f may be configured to generate only N−1 phase-shifted divide-by-N clock signals for those cases where N is greater than two. Thus, in the event N=12, the divide-by-N clock generator 30a may be configured to generate 11 divide-by-N clock signals so that a corresponding output clock signal having a 0.916 times full-period clock skew may be achieved using a one-of-(N−1) select circuit, for N greater than two. Alternatively, in the event N=3, the divide-by-N clock generator 30a may be configured to generate 2 divide-by-N clock signals so that a corresponding output clock signal having a 0.667 times full-period clock skew may be achieved using the one-of-(N−1) select circuit.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. An integrated circuit device, comprising:
   an integrated circuit chip having a clock driver therein that supports generation of a plurality of output clock signals having different frequencies in a range between 1 and 1/N times a frequency of an internal clock signal and full-period programmable skew characteristics, where N is a positive integer greater than one, said clock driver configured to support generation of a divide-by-N clock signal having a full-period programmable skew characteristics that is stepped in N×M time units having a duration equal to 1/M times a period of the internal clock signal, where M is a positive integer greater than eight.

2. The integrated circuit device of claim 1, wherein the clock driver comprises an internal clock signal generator selected from the group consisting of a phase-locked loop (PLL) integrated circuit and a delay-locked loop (DLL) integrated circuit.

3. An integrated circuit device, comprising:
   an integrated circuit chip having a clock driver therein that supports generation of a plurality of output clock signals having different frequencies in a range between 1 and 1/N times a frequency of an internal clock signal and full-period programmable skew characteristics, where N is a positive integer greater than one, said clock driver configured to support generation of a divide-by-N clock signal having a full-period programmable skew characteristics that is stepped in N×M time units having a duration equal to 1/M times a period of the internal clock signal, where M is a positive integer greater than eight and M=C×F, where C and F are positive integers; and
   wherein the N×M time units extend over a full-period of the divide-by-N clock signal at time points defined by: {(−((½C×N)−1)ctu, −(½F)ftu), . . . , (+((½C×N)−1)ctu, +((½F)−1)ftu), (invert, −(½F)ftu)), . . . , (invert, +((½F)−1)ftu)}, where "ctu" designates a coarse time unit and "ftu" designates a fine time unit.

4. The integrated circuit device of claim 1, wherein M=C×F, and C and F are positive integers; and wherein the internal clock signal generator comprises a differential voltage-controlled oscillator having at least ½C stages therein.

5. An integrated circuit device, comprising:
an integrated circuit chip having a clock driver therein that supports generation of a plurality of output clock signals having different frequencies in a range between 1 and 1/N times a frequency of an internal clock signal and full-period programmable skew characteristics, where N is a positive integer greater than one;
wherein the clock driver comprises an internal clock signal generator selected from the group consisting of a phase-locked loop (PLL) integrated circuit and a delay-locked loop (DLL) integrated circuit;
wherein the clock driver is configured to support generation of a divide-by-N clock signal having a full-period programmable skew characteristics that is stepped in N×M time units having a duration equal to 1/M times a period of the internal clock signal, where M is a positive integer greater than eight; and
wherein the clock driver comprises:
a divide-by-N clock generator responsive to a periodic signal; and
a synchronization unit electrically coupled to an output of said divide-by-N clock generator.

6. The integrated circuit device of claim 5, wherein said synchronization unit is responsive to a skew signal.

7. The integrated circuit device of claim 6, wherein said synchronization unit is responsive to a time unit position signal.

8. The integrated circuit device of claim 7, wherein said internal clock signal generator is configured to generate a plurality of periodic signals of equivalent frequency that are phase-shifted relative to each other; and wherein said synchronization unit is responsive to the plurality of periodic signal.

9. An integrated circuit chip, comprising:
a locked loop integrated circuit configured to generate a plurality of internal clock signals that are skewed in time relative to each but have the same first frequency;
a skew signal select circuit configured to generate a selected skew signal derived from at least one of the plurality of internal clock signals;
a divide-by-N clock generator circuit configured to generate at least a first divide-by-N clock signal in response to a first periodic signal generated by said locked loop integrated circuit, where N is a positive integer greater than one;
a synchronization unit configured to generate a second periodic signal that is synchronized to the selected skew signal and has a frequency equal to a frequency of the first divide-by-N clock signal; and
an output buffer configured to drive an off-chip load with an output clock signal having a full-period skew characteristic, in response to the second periodic signal.

* * * * *

UNITED STATES PATENT AND TRADEMARK OFFICE
CERTIFICATE OF CORRECTION

PATENT NO. : 7,151,398 B2  Page 1 of 1
APPLICATION NO. : 11/217195
DATED : December 19, 2006
INVENTOR(S) : Giguere et al.

It is certified that error appears in the above-identified patent and that said Letters Patent is hereby corrected as shown below:

Column 10, line 41, change "characteristics" to -- characteristic --.
Column 10, line 59, change "characteristics" to -- characteristic --.
Column 11, line 20, change "characteristics" to -- characteristic --.

Signed and Sealed this

Thirteenth Day of February, 2007

JON W. DUDAS
*Director of the United States Patent and Trademark Office*